(No Model.)
P. A. MYERS.
HAY CARRIER.
No. 525,715. Patented Sept. 11, 1894.
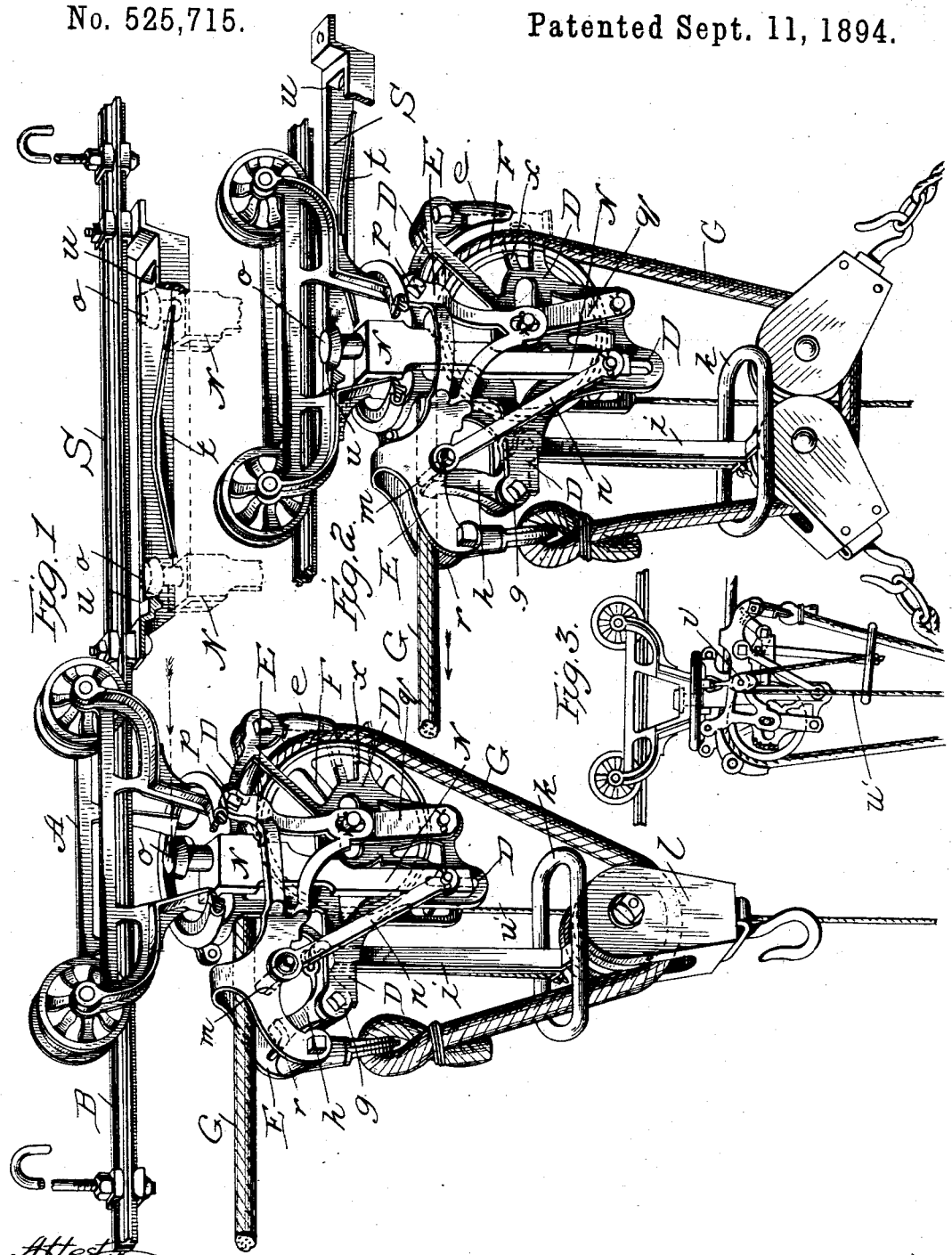

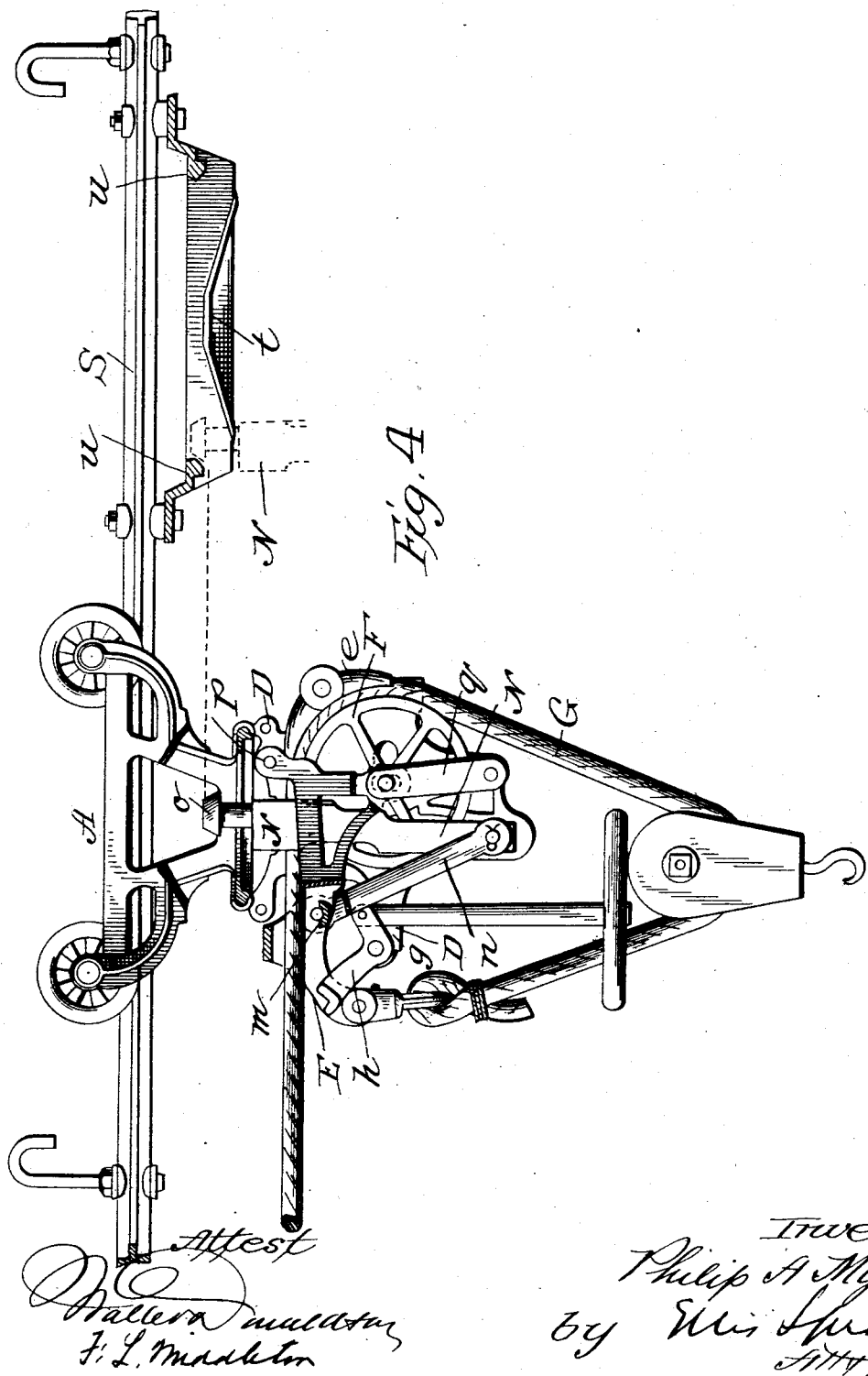

UNITED STATES PATENT OFFICE.

PHILIP A. MYERS, OF ASHLAND, OHIO.

HAY-CARRIER.

SPECIFICATION forming part of Letters Patent No. 525,715, dated September 11, 1894.

Application filed October 18, 1893. Serial No. 488,457. (No model.)

*To all whom it may concern:*

Be it known that I, PHILIP A. MYERS, a citizen of the United States of America, residing at Ashland, in the county of Ashland and State of Ohio, have invented certain new and useful Improvements in Hay-Carriers, of which the following is a specification.

My invention hereinafter described is an improvement in hay carriers. It is designed to increase the capacity of a hay carrier and to adapt it for use in unloading hay, sheaf grain, corn fodder, or any of the similar kinds of crops raised by the farmer. It is, for this purpose constructed to be used, either with a sling, whereby the load is divided, in the wagon, into several parts or with the ordinary hay fork, as the operator may desire.

The special features of the improved construction are shown in connection with old and well known parts of a hay carrier, the whole being illustrated in the accompanying drawings, in which—

Figure 1, represents in perspective the improved hay carrier, in connection with a section of the track and with the stop or knocker on the track. Fig. 2, is a similar view differing mainly in the position of the parts, as hereinafter explained. Fig. 3, shows the construction and position of the hand releasing device. Fig. 4 is a side elevation of the carrier with parts broken away and parts in section.

The hay carrier shown in the above specified figures is provided with a wheel frame or carriage A mounted upon wheels $a$ which run upon a railway B in the usual manner.

The frame work of the hoisting, holding and releasing mechanism is swiveled upon this carriage by means of annular engaging flanges, one upon the lower part of the carriage frame, and the other upon the upper part of what I call for the sake of distinction, the rigid frame or part of the frame work. This (marked D) is rigid in its main relation to the carriage and although swiveled thereon is inflexible in other directions, and is therefore designated the rigid part of the frame to distinguish it from the other part which is pivoted and movable in its relation to said rigid frame. This rigid part of the frame carries a brake shoe $e$ immovable on the part D, and in line with the pulley rim and so near that though it clears the pulley when the latter is in its running position, the pulley may be pressed against it and held by its braking action when the pivoted frame is released and lowered. This frame D has sides as indicated in the drawings (preferably of bars or openwork shown partly broken at $x$ for lightening), and an extension $g$ on which is pivoted a bell crank lever $h$ which forms a stop or support for the pivoted frame. This bell crank lever is pivoted at the angle and its lower arm is pivoted to a link $i$, on the lower end of which is a frame $k$ acted upon by the pulley block $l$ of the sling or fork. When the frame $k$ is raised the upper or stop end of the lever is back, as in Fig. 1, out of the way of the cross bar $m$ over which is the connecting bolt of the pair of links $n$ which are pivoted to the forked standard N carrying the knob $o$ and connect it to the movable frame. This standard is forked and one prong on each side is held so as to move vertically within offset bars of the open work of the movable frame and outside of the fixed frame. The lower ends of these prongs are connected by a cross bolt which works in vertical slots in the fixed frame and also connects the links $n$, on each side. The knob is represented as held up in Fig. 2. It is arranged centrally in the swiveled frame, for purpose hereinafter explained.

The movable frame E is placed on the outside of the fixed frame and is pivoted thereon at $p$ the parts of the frame shown in the figures being duplicated on the other side, not shown. Connected with this frame to move therewith is the pulley F on which runs the rope G. The pivot of the pulley moves in a slot in the fixed frame and holds the opposite duplicate sides of the pivoted frame. It is supported by flat arms $q$ on each side pivoted on the lower part of the fixed frame.

On the free end of the pivoted frame is an extension $r$ made open to admit the rope and provided with an eye or ring for the attaching of the hoisting rope G. The pivotal frame is cast in two parts and the bolt for the upper end of the link $n$ is just above the cross bar under which the stop catches and holds the parts together.

The locking stop or knob on the upper end of the standard N is made round and it is thereby fitted to register with the knocker S.

Whatever way it may be turned as it approaches the said knocker it is lifted by the cam tracks $t$ and stopped by the shoulders $u$ at either end. When once lifted it raises the pivoted frame and thus moves the pulley away from the brake block and releases the pulley. At the same time the link $i$ falls by gravity, and moves the stop arm of the bell crank lever forward to dog the pivoted frame and hold it in raised position. This is released by the raising of the frame $k$ either by means of the load or by hand (as hereinafter explained), when the free end of the pivoted frame is drawn down by the weight of the load through the rope attached to the extension or arm of said frame. The depression of this toward the brake block, presses the rope upon this block, thus locking the pulley and rope. The locking stop or knob together with the knocker on the track constitute the locking means by which the carrier is locked against movement along the track while the load is being raised or lowered. The force of the brake in this construction is always in direct proportion to the amount of the load, for the pulley is pressed against the block, the more, as the weight upon the arm or extension of the pivoted frame is the greater. The pivoted frame acts as a lever, and the amount of force exerted by it may, with any weight be increased more or less by the degree of extension of the said arm. In the form shown the distance between the point where the rope is attached and the frame pivot is double that of the distance between that pivot and the axis of the pulley. This gives a sufficient and reliable lock which automatically regulates itself. It will be readily understood that when the pivoted frame falls the knob is permitted to drop and the carrier is released from the knocker.

The location of the round knob in the center of the swivel always brings it to the knocker, whichever way the carrier may be turned and it always registers with the knocker.

Many large barns are now constructed without cross timbers so that a load of hay may be carried over into the mow, immediately after it is elevated sufficiently to be free from the load. In such constructions it is not necessary that the bundle be elevated to the track, and in order to avoid this unnecessary elevation I have provided a tripping mechanism which may be operated by hand and release the carrier from the stop, at any point of elevation of the load. This in the form shown, consists of a small pulley block which is located on the back side of Figs. 1 and 2, with a rope $u'$ rove through it and attached to the frame or any convenient connection thereof.

The small pulley block is shown at $v$ in Fig. 3. The rope extends down to convenient reach of the man on the load. It requires only to be pulled when the load has reached the desired height, and thereby the frame is raised with the effect described above of releasing the stop and applying the brake, exactly as when the fork or slung block strikes the said frame.

This feature above described is practicable only with the new form of rope lock and would not be practicable where the pulley block of the load must register with the carrier to release said carrier.

In the construction shown the two methods of releasing the carrier from the knocker are useful on the same apparatus; one may be left to act automatically, when desired or if the rope is not pulled, and the other to be operated when the man on the load wishes to release the carrier before the load is raised to the carrier track.

The brake shoe may be placed on the movable part, and the wheel on the fixed part, by modification of details only, and without departing from the spirit of my invention.

I claim—

1. In a hay carrier, a frame, one part of which carries the block for the rope, and the other part is connected to the pulley, one of said parts being movable in relation to the other and having connections for the hoisting rope, and locking means for locking the carrier against movement along the track and also for raising said movable part against the weight of the load connected thereto, substantially as described.

2. In a hay carrier, the main frame, a supplemental frame swiveled thereto, the movable frame carried by the swiveled frame and connected with the hoisting rope to be drawn down by the weight of the load, the brake block on the swiveled frame to move therewith, the pulley connected with the movable frame to move therewith and also to swivel about the main frame to maintain its relation with the brake shoe and the means for lifting the movable frame against the weight of the load, said means serving also to lock the carrier against movement along the track substantially as described.

3. In a hay carrier, a swiveled frame, one part of which carries the block for the rope lock, and the other part connected with the pulley, one of said parts being movable in relation to the other and having connections for the hoisting rope, a stop centrally arranged in the swivel and connected to the movable part, and means to operate the stop for raising said movable part, substantially as described.

4. In a hay carrier, a fixed and a movable frame portion, the rope block on one part, the pulley connected to the other part, the hoisting rope connected with the movable part, the means for lifting the movable part, the stop for engaging and holding the same in raised position, and a frame depending from the stop and arranged to be operated by the load to release the movable frame portion, substantially as described.

5. In a hay carrier, the combination of a relatively fixed part and a movable part of the frame, one part connected with the pulley, a stop connected with the movable part and arranged to engage the knocker on the track, the means for holding the movable part of the frame elevated and the stop in locked position, and a rope as $u'$ for releasing the said part and the stop, substantially as described.

6. In a hay carrier, a frame consisting of a part swiveled on the carriage and having a block for the rope lock and a part pivoted on said swiveled part having an extension for connecting with the hoisting rope, a standard connected to the free end of the pivoted frame, a stop to hold said free end and means for tripping said stop, substantially as described.

7. In a hay carrier, a frame consisting of a part swiveled on the carriage and having a block for the rope lock and a part pivoted on said swiveled part having an extension for connecting with the hoisting rope, a standard connected to the free end of the pivoted frame, a bell crank lever pivoted on the fixed part and arranged to hold up the free end of the pivoted part, and means for tripping said bell crank lever, substantially as described.

8. In a hay carrier, a two part frame one part of which is movable in relation to the other, the block carried by one part and the pulley connected with the other, the means on the carrier frame for lifting the movable part, the stop for holding the same in lifted position and the means for releasing the movable part from said stop, substantially as described.

9. In a hay carrier, a two part frame, one part of which is movable in relation to the other, the block carried by one part and the pulley connected with the other, the means for lifting the movable part, the stop on the carrier frame for holding the same in lifted position and the means arranged to operate the stop for releasing the frame when the load is raised, substantially as described.

10. In combination, the two part frame, one part of which is movable in relation to the other, and is connected to the hoisting rope to sustain the load, the centrally arranged standard carrying the stop, the links connecting the lower end of the standard with the movable frame, the stop for holding the movable frame in raised position and the means for operating the same to release the movable frame, substantially as described.

11. In combination, the two part swiveled frame, one part of which is movable in relation to the other, the block carried by one of said parts and the pulley connected with the other, the round locking knob or stop connected with the movable frame and the knocker arranged to engage the stop for operating the same with the movable frame, substantially as described.

12. In combination the two part frame, one part of which is movable in relation to the other, the pulley and block connected to the two part frame, the stop connected to the movable part, the hoisting rope also connected thereto and the knocker for engaging the stop having an incline for lifting the stop and the shoulder for engaging the stop when raised, substantially as described.

13. In combination, the two part frame, one part of which is movable in relation to the other, the pulley and block connected to the two part frame, the lifting stop, connected to the movable part, the means for locking the movable part in its raised position, the knocker for engaging the stop having an incline for lifting the stop, the shoulder for engaging the stop when lifted and means for releasing the movable part of the frame from the locking means, substantially as described.

14. In combination, the carrier, the knocker, the locking stop on the carrier for engaging the knocker, the means for holding the locking stop in engagement with the knocker, the hoisting rope and the releasing rope connected to the holding means for the locking stop whereby the same may be released without hoisting the load up to the carrier, substantially as described.

15. In a hay carrier the combination of the fixed and movable frame portions, the rope block on one portion, the pulley connected with the other, the means for operating the movable frame part to control the relative positions of the pulley and rope block and the arms pivoted to the frame and carrying the pulley to direct the same toward and from the rope block, substantially as described.

In testimony whereof I affix my signature in presence of two witnesses.

PHILIP A. MYERS.

Witnesses:
JOHN E. MCDOWELL,
F. B. KELLOGG.